Jan. 24, 1961 T. B. BOGERT 2,969,174

ERROR CODE INDICATIONS PROVIDING DEVICES FOR USE IN TAPE PUNCHES

Filed March 2, 1959 3 Sheets-Sheet 1

THURE B. BOGERT
INVENTOR

BY Wenderoth, Lind & Ponack
ATTORNEYS

THURE B. BOGERT
INVENTOR
BY Wenderoth, Lind & Ponack
ATTORNEYS

Jan. 24, 1961

T. B. BOGERT

ERROR CODE INDICATIONS PROVIDING DEVICES FOR USE IN TAPE PUNCHES 2,969,174

Filed March 2, 1959

3 Sheets-Sheet 3

THURE B. BOGERT
INVENTOR

BY Wenderoth, Lind & Ponack
ATTORNEYS

United States Patent Office 2,969,174
Patented Jan. 24, 1961

2,969,174

ERROR CODE INDICATIONS PROVIDING DEVICES FOR USE IN TAPE PUNCHES

Thure Bernhard Bogert, Malmo, Sweden, assignor to Aktiebolaget Addo, Malmo, Sweden, a corporation of Sweden Filed Mar. 2, 1959, Ser. No. 796,347

Claims priority, application Sweden Mar. 3, 1958

3 Claims. (Cl. 234—124)

When a tape punch is coupled to some manually operated machine, such as an adding or calculating machine, to punch in the tape a code representing data manually entered in said machine, it is of advantage to be able to punch error code indications if the operator happens to commit an error when entering data in said machine and immediately notices the error committed. This error code indication can be realized in that one or more further holes are punched in the same position along the tape as the code holes representing the wrong data, a tape reading apparatus in which the tape is then utilized being so constructed as not to read error code indications.

This invention relates to a device for punching error code indications in a simple, convenient and correct manner in tape punches which are adapted, upon energization of electric drive means, to effect one or more consecutive operating cycles, during each of which cycles a feed shaft and a tape feed wheel secured thereto are adapted to be indexed in a feed direction through a step constituting a fraction of a revolution for indexing a tape which engages the tape feed wheel and which is to be provided with code holes by means of punches which can be enabled during each operating cycle of the tape punch by electric control means, one or more of which are adapted, upon energization, to provide punching of error code indications. The invention is substantially characterized by the fact that a rotatable abutment is connected to the feed shaft through a friction clutch, said abutment being adapted, during the rotation of the feed shaft in the feed direction, to move into engagement with, or under slipping of said friction clutch to be in engagement with an actuating member of a switch, thereby opening the switch and holding it open, respectively, and said abutment being moved away from said actuating means for closing said switch by adjusting means, by which the feed shaft is rotatable through one or more steps in the direction opposed to the feed direction, and that the switch operable by said abutment and a manually controllable switch are adapted, only when the two switches are closed, to energize both said switch actuating means and said control means producing the error code indications.

Further objects of the invention and the advantages gained thereby will become apparent from the accompanying drawings diagrammatically illustrating an embodiment of the invention. In the drawings.

Figures 1, 2:
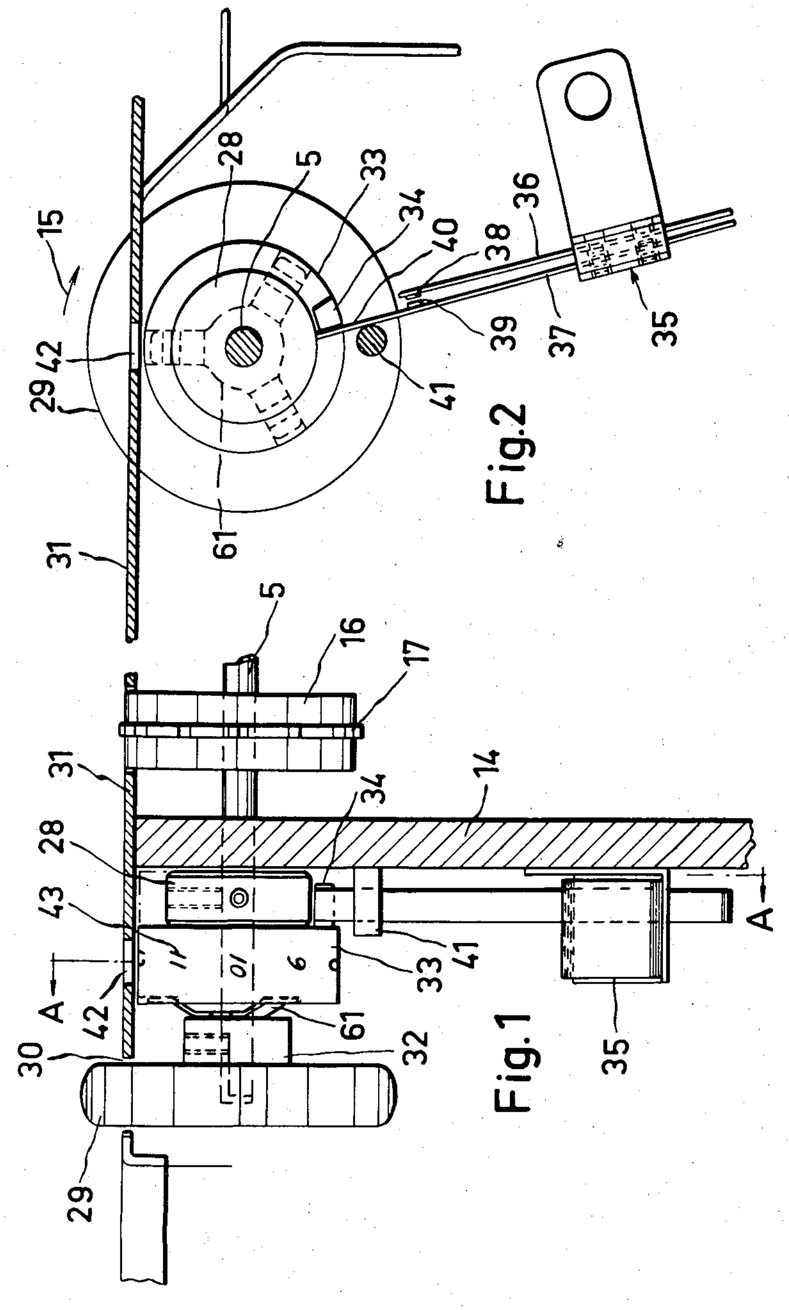
Fig. 1 is a vertical cross section of a portion of a tape punch, certain parts being omitted for the sake of clarity.
Fig. 2 is a section on line A—A in Fig. 1.

In the drawings the invention is shown as applied to a tape punch of the type described in U.S. patent specifications 2,540,029 and 2,700,421.

Figure 4:
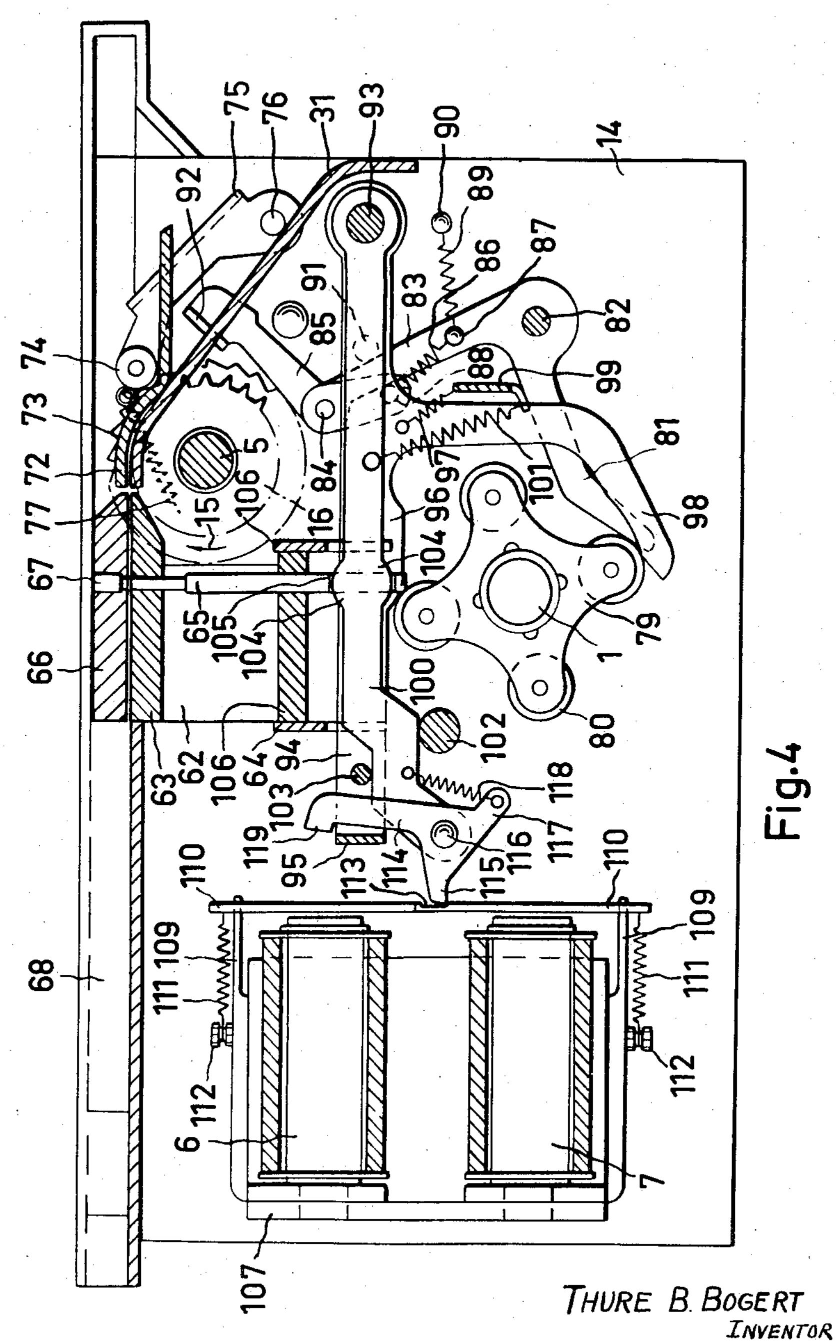
Fig. 4 is a longitudinal vertical section through the tape punch showing known means for punching and step feeding the tape.

As shown in Fig. 4, the tape punch has two substantially rectangular, parallel frame plates 14, of which only one is visible in Figs. 1 and 4. Near the middle of the upper portion of the frame plate 14 shown in Fig. 4 is secured a U-shaped punch frame 62 whose upper limb 63 and lower limb 64 are provided each with nine aligned coaxial bores in which nine rod-shaped hole punches 65 are vertically displaceable. Spaced a small distance above the limb 63 is an abutment plate 66 which is also provided with bores 67 which are coaxial with the punches 65 and in which the punches can engage when holes are punched in a paper tape (not shown) which is advanced by a tape feed device (described in the following) along a tape guide path formed in part by the slot between the limb 63 and the abutment 66, said slot being defined laterally by lateral guide plates 68 (only one is visible in Fig. 4). The punches 65 are disposed in a row at right angles to the longitudinal direction of the tape guide, and one of the punches is adapted, in the manner outlined in the following, to punch during every operation of the apparatus a hole in the tape, thereby producing a row of holes which may serve for the stepwise advance of the tape by means of the tape feed device.

Figure 3:
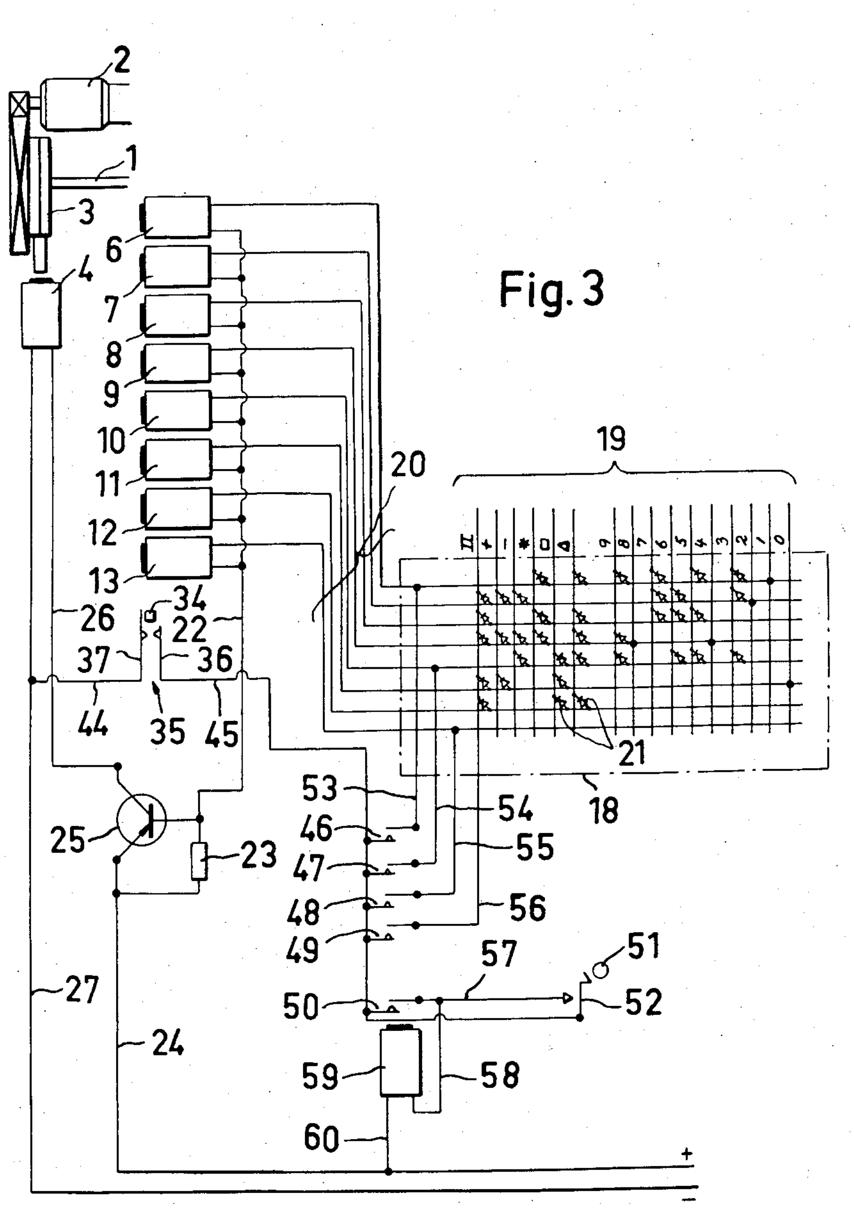
Fig. 3 is a wiring diagram.

The tape feed device has a toothed wheel 16 which is adapted to engage in the above-mentioned feed holes in the tape and is located close to the outlet and of the slot between the limb 63 and the abutment 66 on a shaft 5 extending between the frame plates 14. The teeth 17 of the toothed wheel 16 project upwardly through a slot in a plate 31 (see also Fig. 1) forming a continuation of the tape guide path, so as to engage in the feed holes of the tape. The tape is pressed against the toothed wheel 16 by a plate 72 situated above the plate 31 and also forming part of the guide path. The shaft 5 is rotatably mounted in the frame plates 14 and the toothed wheel 16 is secured to the shaft as is a step feed wheel 73 (shown in Fig. 4 but omitted in Fig. 1 for the sake of clarity) which is secured laterally of the tape guide path to the shaft 5. The step feed wheel 73 and thus also the toothed wheel 16 are yieldingly held in the adjusted position by a roller 74 engaging between the teeth of the step feed wheel and mounted on a lever 75 which is pivoted to the frame plate 14 by means of a pivot 76 and is acted upon by a tension spring 77 stretched between the lever and the frame and tending to hold the roller 74 pressed against the step feed wheel 73. Also mounted on the frame plate 14 is a drive shaft 1 which carries a spider 79 having four equally spaced cam rollers 80 thereon. The shaft 1 is connected to the output portion of a clutch 3 (schematically shown in Fig. 3), the input portion of which is connected to a continuously rotating drive motor 2 (Fig. 3). At each energization of a solenoid 4 controlling the clutch 3 said clutch is engaged for a period of time sufficient for the drive motor 2 to rotate the shaft 1 a quarter of a revolution through the clutch, i.e. one cam roller pitch. As will appear from Fig. 4, one of the rollers 80 during this rotation will cam aside an arm 81 of a bellcrank lever which is mounted on a shaft 82 on the frame. Mounted on the other arm 83 of the bellcrank lever by means of a pivot 84 is a feed pawl 85 which is acted on by a spring 86 stretched between a pin 87 on the lever arm 83 and a pin 88 on the feed pawl 85 and which tends to hold the feed pawl swung into such a position that the pin 88 is held against the lever arm 83. Also secured to the pin 87 is one end of a tension spring 89 the other end of which is secured to a pivot 90 on the frame plate 14. The spring 89 tends to hold the lever arm 83 against a pivot 91 secured to the frame plate 14.

In this starting position of the parts of the feed device, which is shown in Fig. 4, a lug 92 on the feed pawl 85 is disengaged from the step feed wheel 73. When a roller 80, during a quarter revolution, temporarily cams aside the lever arm 81, the lug 92 is swung into engagement with the step feed wheel 73 and takes this wheel along in the direction shown by the arrow 15 in Figs. 2 and 4 through an angle corresponding to one-step advance of the code tape by the toothed wheel 16.

The punches 65 are actuated by the following mechanism which is shown in Fig. 4. Pivotally mounted on a shaft 93 secured to one of the frame plates 14 is a U-shaped member, one limb 94 and the web 95 of said member being shown in Fig. 4. The limb 94 has a downwardly directed projection 96 which extends into the path of the rollers 80 and thus cammed aside by said rollers when the shaft 1 is rotated, the U-shaped member 94, 95 being swung slightly upwardly from the position of rest illustrated against the action of a tension spring 97 which is stretched between a downwardly directed guide arm 98 on the limb 94 and a bar 99 attached to the frame plates 14. The guide arm 98 also reaches up to the area of motion of the rollers 80 and is actuated by them for positively moving the U-shaped member 94, 95 from the raised position to the position of rest shown, in the event that the spring 97 should not alone be able to overcome a possible jamming of the movable parts. One-armed operating levers 100, one for each punch rod 65, are pivotally mounted on the shaft 93 between the limbs 94 of the U-shaped member. Tension springs 101 stretched between the bar 99 and the levers 100 tend to hold the levers in the starting position shown against a transverse rod 102 extending between the frame plates 14, and the spring 97 in turn keeps a transverse rod 103 on the limbs 94 of the U-shaped member against the levers 100 to hold the U-shaped member 94, 95 in the starting position shown. The operating levers 100 have two opposed, upwardly and downwardly directed projections 104 in the shape of circular sectors, which projections engage in a lateral recess 105 in the punch rods 65 so that raising of one operating lever 100 results in the corresponding punch rod 65 being raised for punching a hole in the code tape. Both the levers 100 and the limbs 94 of the U-shaped member are accurately guided in the lateral sense, each being engaged in a guide slot in two guide cams 106 screwed to the leg 64 of the punch frame 62.

Situated opposite the web 95 of the U-shaped member 94, 95 is a magnet frame 107 having two rows of electromagnets 6 to 13 (Figs. 3 and 4) mutually offset as seen in horizontal projection, there being one less electromagnets than the number of operating levers 100, that is to say there are eight electromagnets and nine levers 100. The magnet frame includes uprights 109 to which armatures 110 are pivoted, which are subject to the action of tension springs 111 stretched between the ends of the armatures projecting from the uprights 109 and pins 112 on the magnet frame. The armatures 110 in one row have their free ends projecting between the ends of the armatures in the other row, and each armature has a recess 113 therein. Pawls 114 are mounted on the free ends of all the one-armed operating levers 100 by means of pivots 116, and all pawls excepting one (not shown) have a nose 115 which engages in the recess 113 of the respective associated armature 110. A tension spring 118 stretched between a projection 117 on the respective pawl 114 and the associated lever 100 tends to swing the pawl counterclockwise as seen in Fig. 4, which is, however, prevented by the nose 115 of the pawl bearing against one side edge of the recess or groove 113 in the associated armature 110. Simultaneously the nose 115 of the pawl restricts the swinging movement of the associated armature 110 by the action of the spring 111 of the armature so that the parts are held in the starting position shown in Fig .4. In this position a nose 119 on the respective pawl 114 is spaced laterally of the web 95 of the U-shaped member 94, 95 so that said member can be freely swung upwardly by a means of a roller 80 without being obstructed due to the pawls 114 engaging the armatures 110. Should, on the other hand, one or more of the magnets 6 to 13 be energized, the armature 110 of the respective magnet is attracted so that the associated pawl 114 loses its support in the recess 113 and the spring 118 is able to swing the pawl nose 119 into engagement over the web 95 of the U-shaped member. When the said member is then swung upwardly by a roller 80 in the manner already described, the pawl is brought along in the movement of the said member and thus also carries along the respective associated operating lever 100 which then raises the associated punch rod 65 which is thus caused to punch a hole in the code tape. By energizing one or more magnets 6 to 13 in the known manner it is thus possible to produce the desired code punching in the tape during each operating cycle of the apparatus.

As already mentioned, one of the operating levers 100 has no associated electromagnet and the pawl 114 of this lever has no nose 115 so that the pawl is always engaged with the web 95 of the U-shaped member, whereby the associated punch rod 65 punches a hole in the code tape during each operating cycle. The holes made by this punch 65 are used for advancing the code tape by means of the engagement of the toothed wheel 16 in said holes.

In the illustrated embodiment it is assumed that the tape punch is connected to an adding machine to punch in said tape in a known manner a code which represents digits and functions entered on the keyboard of the adding machine. For this purpose the tape punch has a known diode matrix 18 which is diagrammatically represented within a dash and dot rectangle in Fig. 3. To this matrix there lead from the calculating machine conductors 19 which each represent one digit and function, respectively, and which in a known manner are connectable to the negative terminal of a source of current when they are to be made operative individually for producing a code registration during an operating cycle of the tape punch. From the diode matrix 18 eight conductors 20 lead each to one electromagnet 6–13. These conductors 20 are connected by means of diodes 21 to the conductors 19 in the diode matrix 18 in such a way that the desired code is obtained, i.e. current can flow through those of the conductors 20 which during an operating cycle of the tape punch are connected to the positive terminal of the current source and which are in communication, directly or each over one diode in the diode matrix 18, with the conductor 19 which is momentarily connected to the negative terminal of the current source. The conductors 20 which are connected to one terminal of each of the electromagnets 6–13 are held under positive voltage in that the other terminals of the electromagnets 6–13 are connected with a common conductor 22 which is connected over a resistor 23 to a power line 24 which leads to the positive terminal of the current source. The line 24 is also connected with the injector of a transistor 25, the base of which is connected with conductor 22 and the collector of which is connected by a conductor 26 with one terminal of the electromagnet 4, the other terminal of which is connected with the negative terminal of the current source via a power line 27. When in the manner described above electric current flows through one or more of the conductors 20 to one of conductors 19 during an operating cycle of the tape punch, one or more of the electromagnets 6–13 are energized for selecting desired code punches, and a voltage drop arises over the resistor 23 whereby the transistor 25 will come out of cut off, permitting current to flow from line 24 via conduit 26 to the electromagnet 4 so that the clutch 3 is engaged to cause the tape punch to effect an operating cycle.

All of the illustrated embodiment that has been described above is prior art.

If the operator discovers that he has happened to commit an error when manually entering numbers or functions in the adding machine he can disable the erroneous code in the tape with the aid of the device described in the following which produces punching of error code indications along the erroneous portion of the tape. In the present instance it is assumed that the error code indications consist in a punching operation by means of all the punches controlled by the electromagnets 6–13.

As shown in Figs. 1 and 2, a stop ring 28 is secured to the feed shaft 5 adjacent the side of the frame plate 14 remote from the tape feed wheel 16, and secured a distance from said stop ring to the end of the shaft 5 is a handwheel 29 which partly projects upwardly through an opening 30 in the plate 31 of the tape punch so that the operator is able to rotate the feed shaft 5 by actuating the projecting portion of the handwheel 29. Mounted for rotation on the shaft 5 between the hub 32 of the handwheel 29 and the stop ring 28 is a wheel 33 which is pressed with friction against the stop ring 28 by a three-armed spring washer 61 which is supported by the hub 32. The hub 32, the spring 61 and the stop ring 28 thus form a friction clutch for the wheel 33 so that this can be rotated relative to shaft 5 under considerable friction. The wheel 33 supports an abutment 34 which is thus rotatable about the feed shaft 5 together with the wheel 33. Secured to the frame plate 14 is a switch 35 which has two mutually insulated, resilient contact arms 36 and 37 with contact pieces 38, 39. The switch is so designed that the contact pieces 38, 39 are applied against each other in the non-actuated condition of the switch. The actuating means of the switch is formed by an extension 40 of the contact arm 37, and this extension projects into the path of movement of the abutment 34 on the wheel 33. Normally the abutment 34 bears against the actuating means 40 of the switch and holds it applied against a stop pin 41 which is secured to the frame plate 14. During the indexing of the feed shaft 5 clockwise as seen in Fig. 2 for step feeding the tape the friction clutch as described above will slip, as the actuating means 40 bearing against the pin 41 engages the abutment 34, thus preventing the wheel 33 from partaking in the indexing of the shaft 5. In this normal condition of the parts the switch contacts 38 and 39 are moved apart so that the switch is open. In the normal condition a figure 0 (not shown) on the circumference of the wheel 33 registers with a window 42 in the plate 31 through which the fiugre can be read. Said figure 0 is included in a row of digits 43 on the circumference of the wheel 33, which are spaced such a distance apart as corresponds to the angle through which the shaft 5 is indexed during each operating cycle of the tape punch. By rotating the handwheel 29 counter-clockwise as seen in Fig. 2 the operator can move the code tape in the return direction opposite the feed direction through one or more steps, the number of which is indicated by the digits 43 on the wheel 33. At the same time as the shaft 5 is rotated backwards the wheel 33 also is rotated via said friction clutch counter-clockwise as seen in Fig. 2, while removing the stop 34 from the actuating means 40, whereby the switch 35 is closed for a purpose indicated in the following. When noticing an error the operator moves the code tape in the return direction through as many steps as are necessary in order to disable the erroneous code indication by punching the tape with error indications.

The switch arm 37 is connected through a conductor 44 with the negative terminal of the source of current through the power line 27, and the switch arm 36 is connected by means of a conductor 45 with the fixed contact of five normally open contacts 46–50 and with the movable contact arm of a switch 52 operable by means of a key 51. The movable contact arms of the normally open contacts 46–48 are connected via couductors 53–55 with the conductors 20 leading to the electromagnets 6, 10 and 13, while the movable contact arm of the normally open contact 49 is connected via a conductor 56 with that of the conductors 19 which is designated II. The movable contact arm of the normally open contact 50 is connected via a conductor 57 with the fixed contact arm of the key-operated, normally open contact 52. Branching off from the conductor 57 is a conductor 58 leading to one terminal of a relay coil 59 which is adapted to operate the normally open contacts 46–50 and the other terminal of which is connected via a conductor 60 with the power line 24 leading to the positive terminal of the source of current.

After the operator has rotated the wheel 33 in the above described manner counter-clockwise as seen in Fig. 2 away from the actuating means 40 through one or more steps and has thus moved the code tape in the return direction through a corresponding number of code divisions, the switch 35 has been closed, and when he now depresses the key 51 for punching error indications, the switch 52 is closed so that a circuit is established through the relay magnet 59 via line 24, conductor 60, relay magnet 59, conductors 58, 57, switch 52, conductor 45, the closed switch 35, conductor 44 and line 27. This will energize the relay 59, the normally open contact 50 serving as a holding contact in that it is closed and thus bypasses the key-operated switch 52 whereby the key 51 can be released without the relay 59 being deenergized. At the energization of the relay also the normally open contacts 46–49 are closed so that the punch-operating electromagnets 6, 10 and 13 will become energized via line 24, resistor 23, conductor 22, the electromagnets, their conductors 20, conductors 53–55, the normally open contacts 46–48, conductor 45, switch 35, conductor 44 and line 27, while the electromagnets 7–9, 11 and 12 will be energized via line 24, resistor 23, conductor 22, the electromagnets, their conductors 20, the diodes 21 connected between the last-mentioned conductors and that of the conductors 19 which is designated II, conductor 56, normally open contact 49, conductor 45, switch 35, conductor 44 and line 27. Consequently, all code punches are enabled in the manner required for punching error indications. By the voltage drop over the resistor 23, which arises at the energization, the transistor 25 comes out of cut off so that the relay 4 operating the clutch 3 is energized in the manner earlier described. This will cause the tape punch to effect operating cycle after operating cycle while all punches effect punching operations until the tape punch has carried out the number of operating cycles as set by means of the handwheel 29 and the wheel 33 at which time the abutment 34 again arrives at the actuating means 40 and presses this means against the stop pin 41 while opening the switch 35. At the opening of switch 35 the current passing through the punch operating electromagnets 6–13 as well as the current through the relay coil 59 will be interrupted so that the relay is deenergized. Moreover, the voltage drop over resistor 23 disappears so that the transistor 25 is cut off whereby the clutch 3 is disengaged. The operator can then correctly enter the hitherto erroneously punched code and continue his coding work.

The invention must not of course be considered as limited to the embodiment described above and shown in the drawings, for many modifications may be resorted to within the scope of the invention. Apart from the fact that it is of course insignificant what the code represents and how the code signals are supplied to the tape punch, it should be observed especially that the error-indicating code punching operation can take place in another manner than by punching with all code punches during each operating cycle. Thus a punch may be provided which does not serve any other purpose than that of punching holes aligned with the rows of code holes included in an erroneous code indication. Also, the switch 52 and the relay coil 59 can be omitted when the key 51 is caused directly to actuate the normally open contacts 46–49. In this case, however, the operator must keep the key depressed until the error-indicating punching operations are interrupted by the opening of the switch 35.

What I claim and desire to secure by Letters Patent is:

1. In a tape punch having electric drive means driving, when energized, the tape punch through consecutive operating cycles, a tape feed wheel indexed in one direction a fraction of a revolution during each operating cycle of the tape punch and engaging a tape for feeding the tape lengthwise in a feed direction one step during each operating cycle of the tape punch, punch means for punching an error code indication in the tape, and electric control means for enabling said punch means, a device for controlling the tape punch when punching the tape with error indications, comprising abutment means, friction clutch means connecting said abutment means with the tape feed wheel, normally closed switch means operable by means of said abutment means, said friction clutch means tending to move said abutment means into engagement with and to hold said abutment means in engagement with said switch means during the indexing of the tape feed wheel in the tape feed direction to hold said switch means in an open condition, adjusting means connected with the feed wheel for moving the feed wheel and the tape in the return direction, i.e. opposite the feed direction, and thereby moving said abutment means via said friction clutch means out of engagement with said switch means in order to close said switch means, manually operable switch means, and electric circuit means interconnecting said manually operable switch means, said switch means operable by said abutment means, the electric control means for enabling the punch means, and the drive means so that an error code indication is made in the tape by the punch means only when both said manually operable switch means and said switch means operable by said abutment means are closed.

2. In a tape punch having electric drive means driving, when energized, the tape punch through consecutive operating cycles, a tape feed wheel indexed in one direction a fraction of a revolution during each operating cycle of the tape punch and engaging a tape for feeding the tape lengthwise in a feed direction one step during each operating cycle of the tape punch, punch means for punching an error code indication in the tape, and electric control means for enabling said punch means and energizing the drive means, a device for controlling the tape punch when punching the tape with error indications, comprising abutment means, friction clutch means connecting said abutment means with the tape feed wheel, normally closed switch means operable by means of said abutment means, said friction clutch means tending to move said abutment means into engagement with and to hold said abutment means in engagement with said switch means during the indexing of the tape feed wheel in the tape feed direction to hold said switch means in an open condition, adjusting means connected with the feed wheel for moving the feed wheel and the tape in the return direction, i.e. opposite the feed direction, and thereby moving said abutment means via said friction clutch means out of engagement with said switch means in order to close said switch means, manually operable switch means, electrical connecting means electrically connecting said manually operable switch means in series with said switch means operable by said abutment means, a relay, energized by closing both of said switch means, a holding contact in said relay electrically connected in parallel with said manually operable switch means, and normally open contact means in said relay electrically connecting, when operated, said electrical connecting means with the electric control means for enabling the punch means and the drive means.

3. In a tape punch having electric drive means driving, when energized, the tape punch through consecutive operating cycles, a tape feed wheel indexed in one direction a fraction of a revolution during each operating cycle of the tape punch and engaging a tape for feeding the tape lengthwise in a feed direction one step during each operating cycle of the tape punch, punch means for punching an error code indication in the tape, and electric control means for enabling said punch means, a device for controlling the tape punch when punching the tape with error indications, comprising an indicating wheel, abutment means on said indicating wheel, friction clutch means connecting said indicating wheel with the tape feed wheel, normally closed switch means operable by means of said abutment means, said friction clutch means tending to move said abutment means on said indicating wheel into engagement with and to hold said abutment means in engagement with said switch means during the indexing of the tape feed wheel in the tape feed direction to hold said switch means in an open condition, adjusting means connected with the feed wheel for moving the feed wheel and the tape in the return direction, i.e. opposite the feed direction, and thereby moving said abutment means on said indicating wheel via said friction clutch means out of engagement with said switch means in order to close said switch means, a casing enclosing said indicating wheel, a window in said casing, digits on said indicating wheel visible through said window to indicate the number of steps that the feed wheel has been moved by said adjusting means in the return direction, manually operable switch means, and electric circuit means interconnecting said manually operable switch means, said switch means operable by said abutment means, the electric control means for enabling the punch means, and the drive means so that an error code indication is made in the tape by the punch means only when both said manually operable switch means and said switch means operable by said abutment means are closed.

References Cited in the file of this patent

UNITED STATES PATENTS 2,411,794 Lake ---------------- Nov. 26, 1946